(12) United States Patent
Bulatowicz

(10) Patent No.: US 7,552,664 B2
(45) Date of Patent: Jun. 30, 2009

(54) HARMONIC DRIVE GEAR ASSEMBLY WITH ASYMMETRICAL WAVE GENERATOR AND ASSOCIATED FLEXSPLINE

(75) Inventor: Michael David Bulatowicz, Castaic, CA (US)

(73) Assignee: Northrop Grumman Guidance and Electronics Co., Inc., Woodland Hills, CA (US)

(*) Notice: Subject to any disclaimer, the term of this patent is extended or adjusted under 35 U.S.C. 154(b) by 0 days.

(21) Appl. No.: 11/267,108

(22) Filed: Nov. 4, 2005

(65) Prior Publication Data

US 2007/0101820 A1 May 10, 2007

(51) Int. Cl.
*F16H 35/00* (2006.01)
(52) U.S. Cl. .......................................... 74/640
(58) Field of Classification Search .................... 74/640
See application file for complete search history.

(56) References Cited

U.S. PATENT DOCUMENTS

| | | | | |
|---|---|---|---|---|
| 3,088,333 A | * | 5/1963 | Musser | 74/640 |
| 4,237,751 A | | 12/1980 | Davis | |
| 4,379,976 A | * | 4/1983 | Pitchford et al. | 310/83 |
| 4,429,595 A | * | 2/1984 | Butterfield | 475/168 |
| 4,951,518 A | * | 8/1990 | Hendershot | 74/395 |
| 4,974,470 A | * | 12/1990 | Ishikawa et al. | 74/640 |
| 6,845,689 B2 | * | 1/2005 | Tanioka | 74/640 |
| 7,086,309 B2 | * | 8/2006 | Stoianovici et al. | 74/640 |

FOREIGN PATENT DOCUMENTS

| | | |
|---|---|---|
| DE | 1 167 147 | 4/1964 |
| DE | 197 08 310 A1 | 9/1998 |
| EP | 0 158 751 A2 | 10/1985 |
| EP | 1 043 482 A2 | 10/2000 |
| EP | 1 536 160 A1 | 6/2005 |
| GB | 2 064 685 A | 6/1981 |
| GB | 2 132 764 A | 7/1984 |
| JP | 59140938 | 8/1984 |
| JP | 59141775 | 8/1984 |

\* cited by examiner

*Primary Examiner*—Ha D. Ho
(74) *Attorney, Agent, or Firm*—Lynn & Lynn

(57) ABSTRACT

A wave generator has a circular spline, a flexspline inside the circular spline and a plug inside the flex spline. The plug is asymmetrical and is preferably formed to comprise a semi-elliptical first portion and a semi-cylindrical second portion. The diameter of the semi-cylindrical portion coincides with the major axis of the semi-elliptical portion. Gear teeth on the circular spline and on the flex spline are meshed in only a first zone and unmeshed in a second zone. The flexspline in the harmonic drive gear assembly according to the present invention preferably has only one tooth fewer than the circular spline so that the circular spline rotates through and arc defined by one gear tooth for each complete revolution of the flexspline.

3 Claims, 5 Drawing Sheets

HARMONIC DRIVE GEAR ASSEMBLY WITH ASYMMETRICAL WAVE GENERATOR AND ASSOCIATED FLEXSPLINE

BACKGROUND OF THE INVENTION

This invention relates generally to a drive mechanism for a positioning system.

Harmonic drive gearing is a single-stage gear transmission having three main components. These components are known as the circular spline, the flexspline, and the wave generator. The circular spline is a circular, rigid sun gear with teeth on its inner surface. The flexspline is a thin-walled cup with teeth on its outer surface, which are designed to mesh with the teeth of the circular spline. The flexspline is radially flexible and torsionally rigid, and has fewer teeth and a smaller radius than the circular spline. The wave generator is a non-circular cam, which fits inside the flexspline and deforms it to cause some of its teeth to mesh with the teeth of the circular spline and others to completely unmesh. Each full rotation of the wave generator causes the flexspline to walk around the circular spline at a rate equal to the difference in the number of teeth of the flexspline to the number of teeth of the circular spline. For example, if the circular spline has 100 teeth and the flexspline has 98 teeth, each revolution of the wave generator will walk the flexspline around the circular spline a distance equal to two teeth.

Industries benefiting from harmonic drive gearing include semiconductor, machine tool, factory automation, robotics, medical equipment and aerospace. Medical applications benefiting from harmonic drive gearing include patient beds, rehabilitations equipment, and MRI/CAT scan gantries. Other uses for harmonic drives include radiation therapy equipment, imaging camera positioning and surgical robots. Robots used in semiconductor component manufacturing use harmonic drives to accurately position wafers for processing, loading, unloading, inspection and test. Military and aerospace applications of harmonic drive gearing include communication, military surveillance, and weather satellites, several deep space probes, telescopes including the Hubble Space Telescope, and the International Space Station. Harmonic Drives are used to accurately control antennas and compass gimbals, to align scientific instruments, adjust apertures and solar panels and open and close hatches and doorways.

These applications require high positional accuracy, repeatability, and low vibration. Harmonic drive gear sets are ideal for precision applications that require a compact design and high torque to weight ratio. They are capable of less than one arc minute positional accuracy and repeatability of +/−5 arc seconds without the benefit of feedback at the output stage.

The traditional design for harmonic drive gearing involves a flexspline with two fewer teeth than the circular spline and an elliptical wave generator designed such that it causes the teeth of the flexspline to mesh with the teeth of the circular spline in two zones, diametrically opposed to each other and corresponding to the major axis of the ellipse. The minor axis of the wave generator is short enough that it allows the teeth of the flexspline to completely unmesh in the zones along the minor axis and allows a one-tooth difference in length between the circular spline and the flexspline in the areas of no contact. The torque capacity of the gearing system is equal to the shear force necessary to cause the teeth in contact to fail. This so allows the existence of a "ratcheting torque," under which the flexspline may slip by a distance of one tooth relative to the circular spline. This increases the number of teeth in contact and therefore the torque capacity and the torsional rigidity. However, this condition greatly increases the forces on the flexspline, greatly reducing its fatigue life. Furthermore, it throws the system out of balance, greatly increasing noise and vibration and reducing positional accuracy.

SUMMARY OF THE INVENTION

The present invention comprises a modification to the current design of the wave generator and a corresponding change to the design of the flexspline. The new wave generator according to the present invention has a semi-ellipsoidal first portion and a semi-cylindrical second portion arranged so that their flat sides coincide. The major and minor axes of the elliptical portion may be the formed in accordance with in the traditional design, and the diameter of the semi-circle is equal to the length of the major axis of the ellipse. The flexspline in the harmonic drive gear assembly according to the present invention has only one tooth fewer than the circular spline. The wave generator has an asymmetrical cutout, which keeps the center of gravity of the system aligned with the central axis of the circular spline.

DETAILED DESCRIPTION OF THE INVENTION

Figure 1:
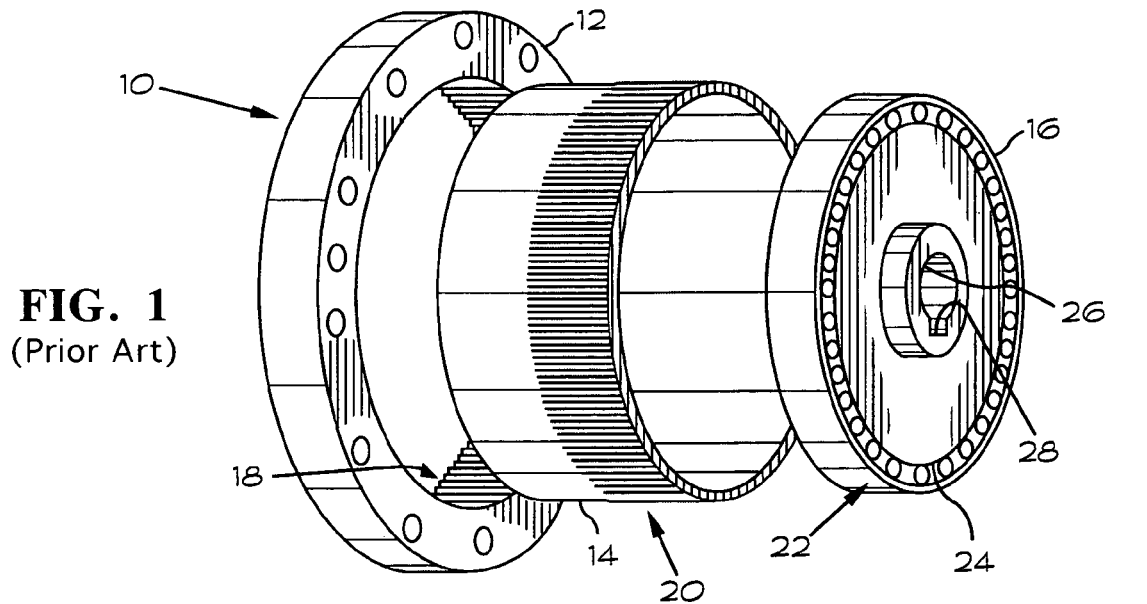
FIG. 1 is an exploded perspective view of a prior art harmonic drive assembly having a circular spline, a flexspline and a wave generator.

A brief description of a typical prior art harmonic drive gear assembly 10 is presented here to facilitate an understanding of the present invention. As shown in FIG. 1 the harmonic drive gear assembly 10 includes a circular spline 12, a flexspline 14 and a wave generator 16. The circular spline is formed as a rigid ring having a plurality of internal gear teeth 18. The flexspline 14 is formed as a non-rigid, thin steel cup having external gear teeth 20 on a slightly smaller pitch diameter than the gear teeth 18 on the circular spline 12. The flexspline 14 fits over the wave generator 16, which holds the flexspline 14 in an elliptical shape. The wave generator 16 includes a thin raced ball bearing assembly 22 that fits onto an elliptical plug 24. The flexspline 14 is slightly smaller in diameter than the circular spline and typically has two fewer gear teeth.

Figure 2A:
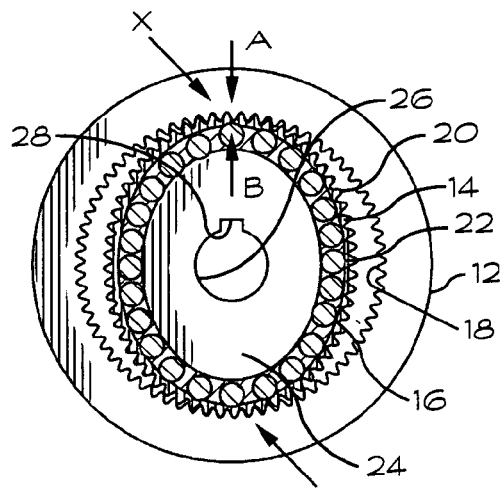
FIGS. 2A-2C illustrate the basic operational features of prior art harmonic drive assemblies as the wave generator rotates 90° and 180° from an initial position relative to the flexspline.
Figure 2B:
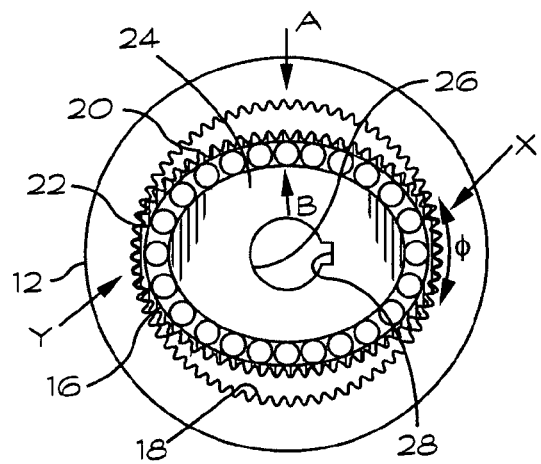
Figure 2C:
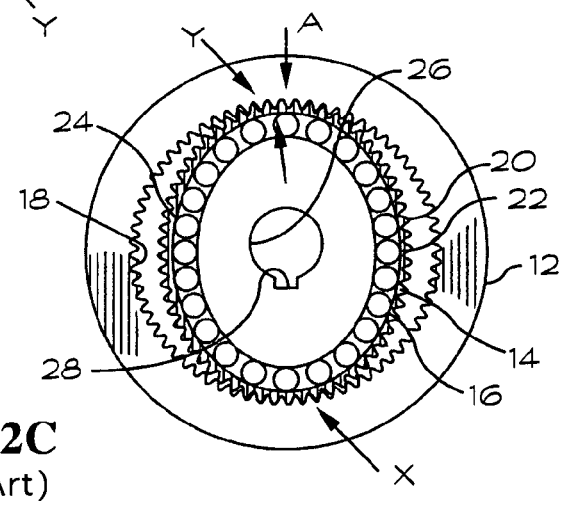

As shown in FIGS. 2A-2C, the elliptical shape of the wave generator causes the gear teeth 20 of the flexspline 14 to engage the gear teeth 18 of the circular spline 12 at two opposite zones X and Y across the major axis of the ellipse. A driveshaft (not shown) placed in a hole 26 in the plug 24 provides a power input to the harmonic drive gear assembly 10. The hole 26 may include a slot 28 arranged to receive a projection from the driveshaft to insure that the plug 24 rotates with the driveshaft without slippage. The slot 28 also provides convenient means for determining the angular position of the wave generator 16. In FIG. 2A the slot points vertically upward. As the wave generator 16 is rotated by a shaft (not shown) driven by a power source (not shown), a continuously moving elliptical form or wave-like motion is imparted to the flexspline 14. This causes the internal gear teeth 18 of the circular spline 12 to mesh with the external gear teeth 20 of the flexspline 14 at the zones X and Y and provides for one full tooth disengagement at the end points of the minor axis of the ellipse. The zones X and Y where the gear teeth 20 of the flexspline 14 engage the gear teeth 18 of the circular spline 12 rotate with the major elliptical axis.

For each 180° clockwise movement of the wave generator 16, the flexspline 14 rotates counter clockwise by one tooth relative to the circular spline 12. Therefore, each complete clockwise rotation of the wave generator 16 causes the flexspline 14 to rotate counter clockwise by two gear teeth from its original position relative to the circular spline. For example, in FIG. 2A gear teeth A and B of the circular spline 12 and the flexspline 14 are in alignment as shown by the corresponding arrows. FIG. 2B shows the harmonic drive gear assembly 10 after the plug 24 has rotated 90° clockwise from its position in FIG. 2A so that the slot is horizontal. The contact zones X and Y have also rotated 90° clockwise. In FIG. 2B the gear teeth 2A and 2B are out of alignment by half a gear tooth. FIG. 2C shows the harmonic drive gear assembly 10 after the plug 24 has rotated 180° clockwise from its position in FIG. 2A. In FIG. 2C the contact zones X and Y have reversed positions from those shown in FIG. 2A, and the gear teeth A and B are out of alignment by one full gear tooth.

The basic three-element harmonic drive gear assembly 10 is capable of functioning as a speed reducer. Input from the power source may be at a high speed, but the two-tooth per revolution displacement causes the flexspline 14 to rotate at considerably slower rate. The reduction ratio may be calculated by dividing the number of teeth on the flexspline 14 by the difference in the number of teeth on the flexspline 14 and the circular spline 12. For example, if the flexspline 14 has 200 teeth, and the circular spline 12 has 202 teeth, the gear ratio will be calculated as 200/(200−202)=−100. The negative sign indicates that the input and output rotate in opposite directions.

Figure 3:
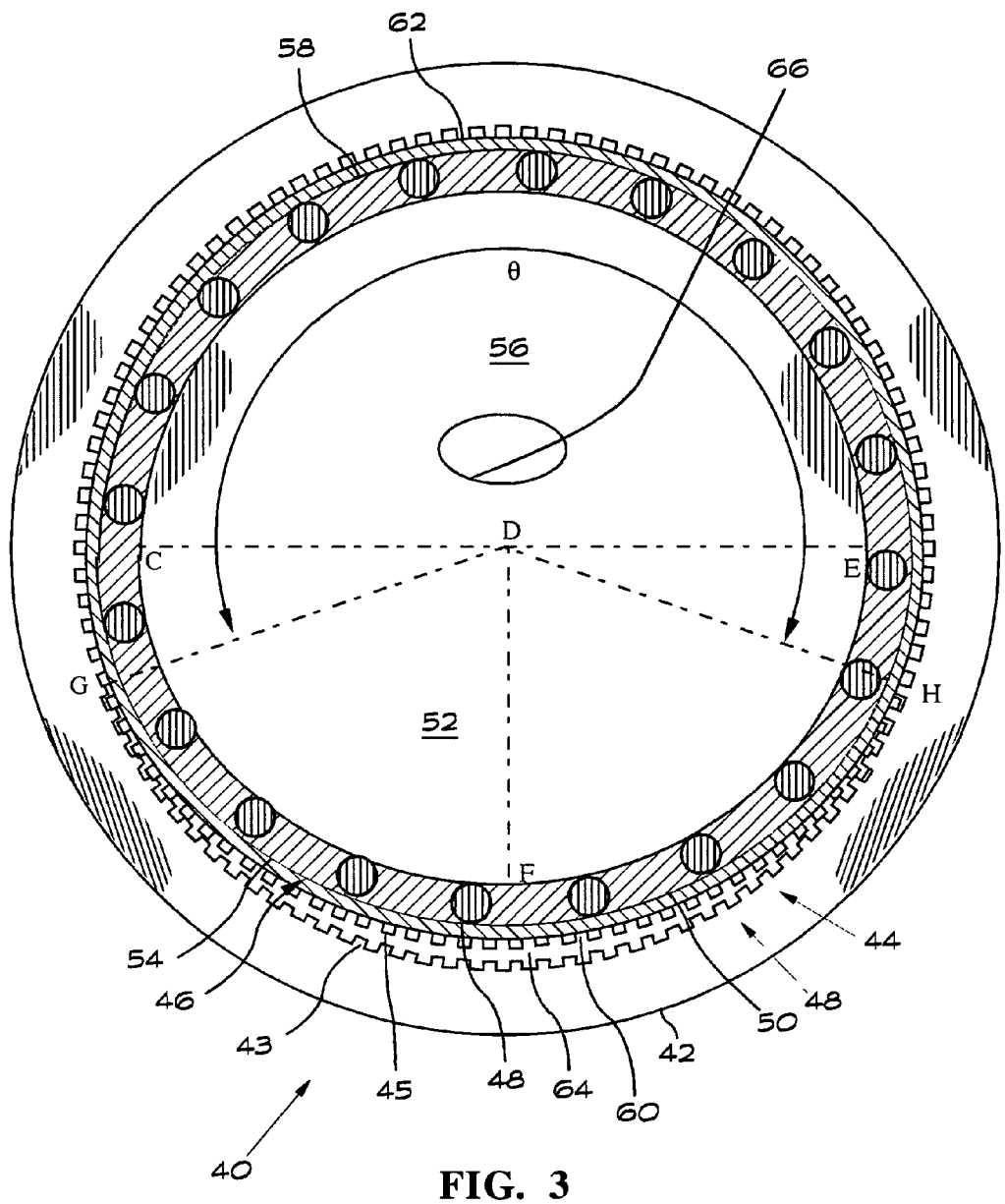
FIG. 3 is an end elevation view of a harmonic drive assembly having a circular spline, a flexspline and a wave generator formed and arranged according to the present invention.
Figure 4:
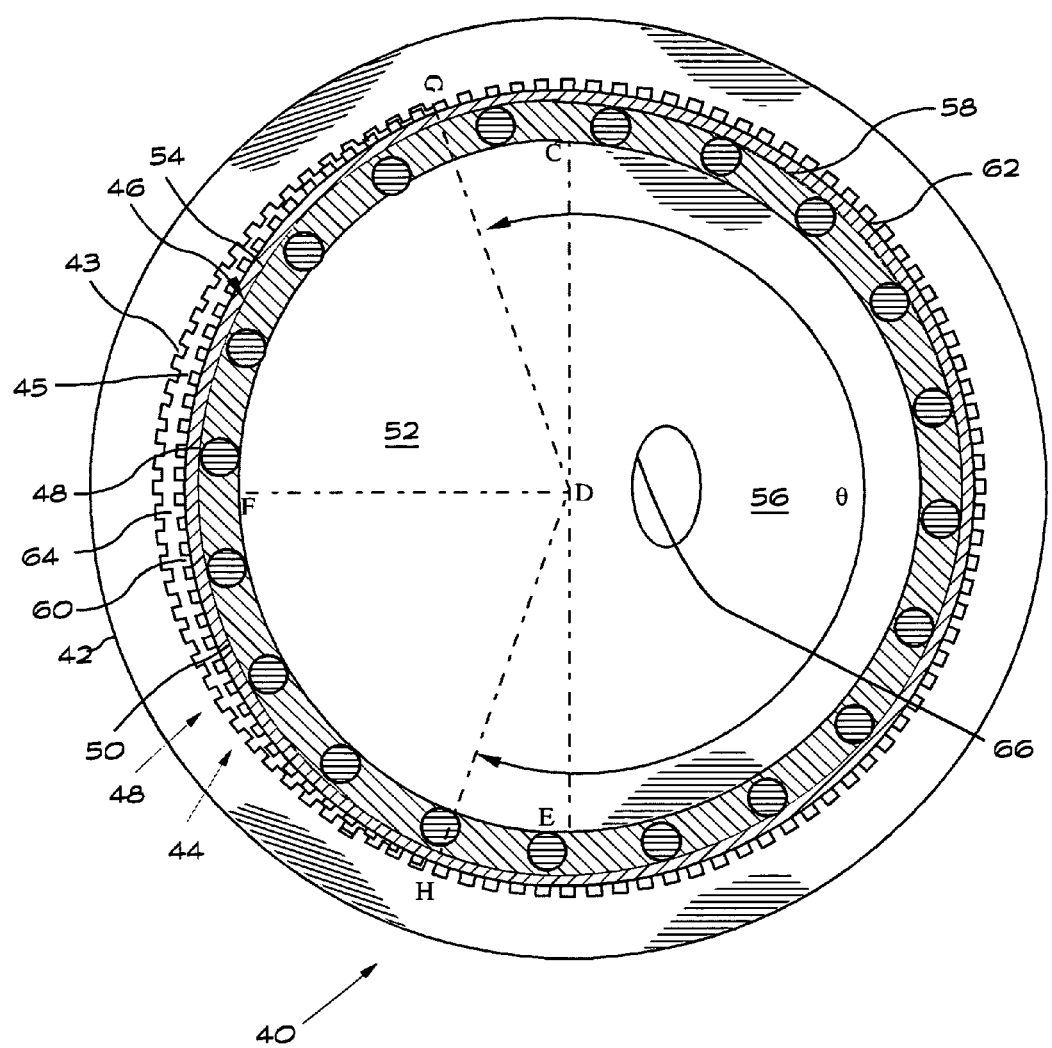
FIG. 4-6 are end elevation views illustrating basic operational features of the present invention and showing gear tooth mesh zones for the present invention as the wave generator of FIG. 3 rotates 90°, 180° and 270° from its position shown in FIG. 3.
Figure 5:
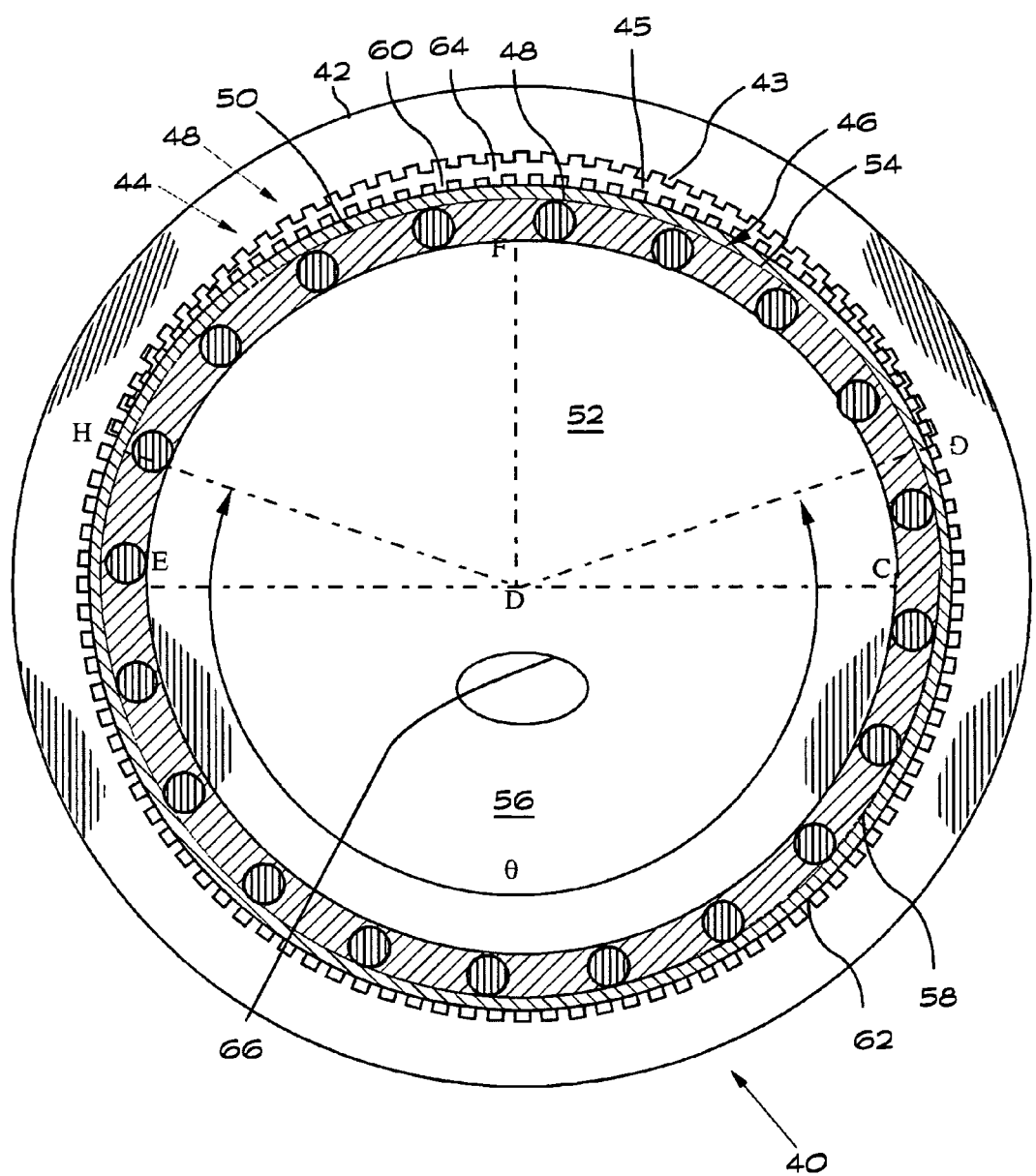
Figure 6:
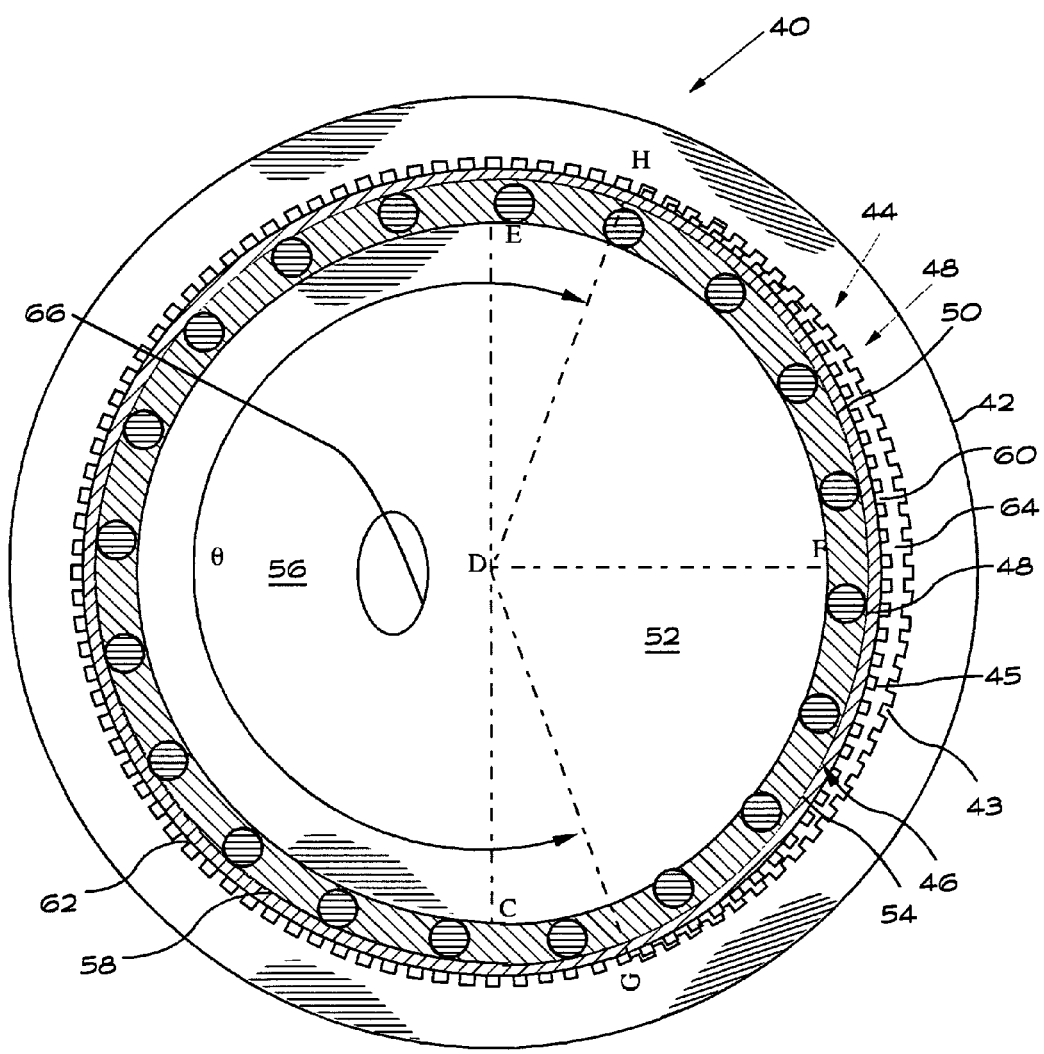

As shown in FIG. 3, a harmonic drive gear assembly 40 includes a circular spline 42, a flexspline 44 and a wave generator 46. The circular spline 42 has a plurality N of internal gear teeth 43 similar to the gear teeth 18 of the circular spline 12. The flexspline 44 has a plurality N−1 of external gear teeth 45 that are arranged to mesh with the gear teeth 43. The wave generator 46 includes a ball bearing assembly 48 with an asymmetrical plug 50 mounted therein in a manner similar to the manner in which the plug 24 is mounted in the ball bearing assembly 22 of FIG. 1. The plug 50 includes a first semi-ellipsoidal portion 52 that has semi-elliptical end 54. The semi-elliptical end 54 has a major axis indicated by a line CDE and a semi-minor axis indicated by the line DF. The plug 50 also includes a semi-cylindrical portion 56 having a semicircular end 58. The semi-ellipsoidal portion 52 and the semi-cylindrical portion 56 are arranged so that the major axis of the semi-ellipsoidal portion 52 coincides with the diameter of the semi-cylindrical portion 56.

Still referring to FIG. 3, the flexspline 44 conforms to the shape of the semicircular end 58 of the semi-cylindrical portion 56 so that the flexspline 44 has a semi-ellipsoidal portion 60 and a semi-cylindrical portion 62 that correspond to the semi-ellipsoidal portion 52 and the semi-cylindrical portion 56 of the wave generator plug 50. Therefore, as shown in FIG. 3, all of the gear teeth 45 of the flexspline 44 in semi-cylindrical portion 62 are engaged with corresponding gear teeth 43 of the circular spline 42, forming a single zone of contact. However, because the semi-minor axis DF of the semi-elliptical end 54 of the wave generator plug 50 is shorter than half of the major axis CDE, several of the gear teeth of the semi-ellipsoidal portion 52 are not engaged with gear teeth of the circular spline. Because the single zone of contact and a single zone of no contact in which the flexspline 44 has one less tooth that the circular spline 42, a full revolution of the wave generator 46 causes the flexspline to walk around the circular spline a distance of one gear tooth.

The obtuse angle θ between the lines DG and DH indicates the approximate zone in which gear teeth of the flexspline 44 and the gear teeth of the circular spline 42 are meshed. The angle θ in the example shown is approximately 215°. The angle θ may vary with the geometry of the teeth of the flexspline 44 and the circular spline 42; the number of teeth, as well as tooth size, pitch, and shape may affect the necessary geometry of the plug 50, which in turn may affect the angle θ. In contrast to the present invention, the typical prior harmonic drive gear assembly 10 has two zones of contact X and Y as previously described. Each of the contact zones X and Y commonly extends about 40° around the circular spline 12, giving a total contact angle of about 80°. This contact angle is subject to the same influences as the angle θ.

This present invention provides a single zone of contact in which more than half of the teeth of the flexspline 44 and circular spline 42 mesh, and a single zone of no contact in which the difference of one tooth will exist in the gap 64 between the flexspline 44 and the circular spline 42. Therefore, with each full revolution of the wave generator 46, the flexspline 44 will walk around the circular spline 42 a distance of one tooth.

The asymmetrical shape of the plug 50 causes its center of gravity to be displaced from the axis of rotation. Therefore, it is advantageous to form a hollow portion 66 in the semi-cylindrical portion 56 to remove an amount of material sufficient to cause the center of gravity to be on the axis of rotation of the plug 50. This reduces unwanted vibrations that could result when an unbalanced system rotates.

Without changing the package size from previous devices, the harmonic drive gear assembly 40 according to the present invention provides several improvements over previous harmonic drive gear assemblies. First, the present invention permits the gear ratio to be doubled. Because the difference in the number of gear teeth on the flexspline 44 is one less that the number of gear teeth on the circular spline 42, the gear ratio is simply the number of gear teeth 45 on the flexspline 44. Second, there will be twice as many potential gear ratios to select from. Third, the torque capacity may greatly increase as a result of the increased angular region of contact provided by the harmonic drive gear assembly 40. Assuming that the gear teeth would fail before the flexspline 44 itself would fail, the torque capacity is increased by a factor equal to the ratio of the number of teeth in contact in the new design to the number of teeth in contact with the traditional design. Fourth, the ratcheting torque is also greatly increased and no longer changes the configuration of the flexspline 44. Fifth, with double the potential gear ratio, the positional repeatability is improved. Sixth, the teeth 45 of the flexspline 44 have half as many mesh/unmesh cycles per revolution of the wave generator 46 as in the prior art devices, thus providing increased efficiency while reducing noise for a given input speed. Seventh, the torsional rigidity between the flexspline coupling and the wave generator coupling are increased.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A harmonic drive gear assembly comprising:
a circular spline formed as a hollow cylinder having a first plurality of inner gear teeth formed to extend around an inner circumferential portion of the hollow cylinder;
a flexspline formed as a thinwalled hollow cylinder having an outer circumference smaller than that of the inner circumferential portion of the circular spline, the flexspline having a plurality of outer gear teeth extending around an outer circumferential portion of the thin walled hollow cylinder, the flexspline being formed to be placed inside the circular spline such that a portion of the inner gear teeth and portion of the outer gear teeth are meshed; and
a wave generator formed for placement within the flexspline, the wave generator including a plug having a first side region formed to have a semi-ellipsoidal configuration having a semi-elliptical end having a major axis of a selected length and a second side region having formed to have a semi-cylindrical configuration having a semi-circular end having a diameter that coincides with the major axis of the semi-elliptical end of the first side region, and a bearing assembly placed around a peripheral portion of the plug such that the bearing assembly extends around both the first and second side regions and conforms to the semi-ellipsoidal configuration of the first side region and conforms to the semi-cylindrical configuration of the second side region, the wave generator being arranged to fit closely within the flexspline such that the flexspline has first and second side regions that have the same configurations as the first and second side regions of the plug, respectively, the gear teeth of the flexspline and the circular spline being meshed in a first angular zone of the circular spline and being completely disengaged in a second angular zone of the circular spline.

2. The harmonic drive gear assembly of claim 1 wherein the first and second side regions of the plug are asymmetrical with respect to one another.

3. The harmonic drive gear assembly of claim 1 wherein the plug has a lengthwise cavity formed therein such that the center of gravity of the plug is on its axis of rotation.

* * * * *